(12) United States Patent
Heyne et al.

(10) Patent No.: US 11,529,888 B2
(45) Date of Patent: Dec. 20, 2022

(54) METHOD FOR CHARGING A TRACTION BATTERY OF A MOTOR VEHICLE

(71) Applicant: Dr. Ing. h.c. F. Porsche Aktiengesellschaft, Stuttgart (DE)

(72) Inventors: Raoul Heyne, Wiernsheim (DE); Timo Kaul, Bietigheim-Bissingen (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 0 days.

(21) Appl. No.: 17/392,340

(22) Filed: Aug. 3, 2021

(65) Prior Publication Data

US 2022/0032816 A1    Feb. 3, 2022

(30) Foreign Application Priority Data

Aug. 3, 2020   (DE) ..................... 10 2020 120 383.7

(51) Int. Cl.
*B60L 53/10*    (2019.01)
*B60L 53/62*    (2019.01)
(Continued)

(52) U.S. Cl.
CPC .............. *B60L 58/18* (2019.02); *B60L 53/11* (2019.02); *B60L 53/62* (2019.02); *H02J 7/0013* (2013.01);
(Continued)

(58) Field of Classification Search
CPC .......... B60L 58/18; B60L 53/11; B60L 53/62; B60L 2210/10; B60L 2210/20;
(Continued)

(56) References Cited

U.S. PATENT DOCUMENTS 10,675,991 B2    6/2020  Hu et al.
2012/0041613 A1*  2/2012  Narel ................. H02J 3/14
                                              700/297
(Continued)

FOREIGN PATENT DOCUMENTS

DE   10 2018 000 490   7/2018
DE   10 2019 111 407   11/2019
DE   10 2019 007 868   7/2020

OTHER PUBLICATIONS

German Examination Report dated Apr. 15, 2021.

*Primary Examiner* — Lincoln D Donovan
*Assistant Examiner* — Alex W Lam
(74) *Attorney, Agent, or Firm* — Gerald E. Hespos; Michael J. Porco

(57) ABSTRACT

A method for charging a traction battery of a vehicle at a stationary charging column includes having the vehicle charging controller register a charging process to the charging column charging controller with a high voltage value of the traction battery as a requested maximum charging voltage. The charging column charging controller then performs an insulation test at an insulation test voltage that corresponds to the requested maximum charging voltage or to the maximum charging column voltage when the latter is lower than the requested maximum charging voltage. The insulation test voltage is measured by a vehicle voltmeter. If the measured insulation test voltage corresponds to the lower voltage value, the vehicle charging controller registers a charging process to the charging column charging controller with the low voltage value as new requested charging voltage and sets the charging voltage adapter to a charging column voltage corresponding to the low voltage value.

2 Claims, 1 Drawing Sheet

(51) Int. Cl.
*B60L 58/18* (2019.01)
*H02J 7/00* (2006.01)

(52) U.S. Cl.
CPC ....... *B60L 2210/10* (2013.01); *B60L 2210/20* (2013.01); *B60L 2240/527* (2013.01); *B60L 2240/547* (2013.01)

(58) Field of Classification Search
CPC ......... B60L 2240/527; B60L 2240/547; B60L 53/66; B60L 53/60; B60L 53/22; B60L 58/19; B60L 58/21; B60L 53/31; B60L 53/16; B60L 53/24; H02J 7/0013; H02J 7/0047; H02J 7/02; Y02T 90/14; Y02T 10/70; Y02T 10/7072; Y02T 90/12; Y02T 90/16; G01R 27/18; G01R 27/025; H02H 3/16; B60Y 2200/91
See application file for complete search history.

(56) References Cited

U.S. PATENT DOCUMENTS

| | | | | |
|---|---|---|---|---|
| 2012/0049795 | A1* | 3/2012 | Dougherty | B60L 53/66 320/109 |
| 2013/0300429 | A1* | 11/2013 | Jefferies | B60L 53/31 324/511 |
| 2014/0091750 | A1* | 4/2014 | Ikeda | H01M 10/441 320/104 |
| 2017/0334303 | A1* | 11/2017 | Kristof | B60L 53/16 |
| 2019/0070971 | A1 | 3/2019 | Kusumi et al. | |
| 2020/0185936 | A1 | 6/2020 | Oishi et al. | |

* cited by examiner

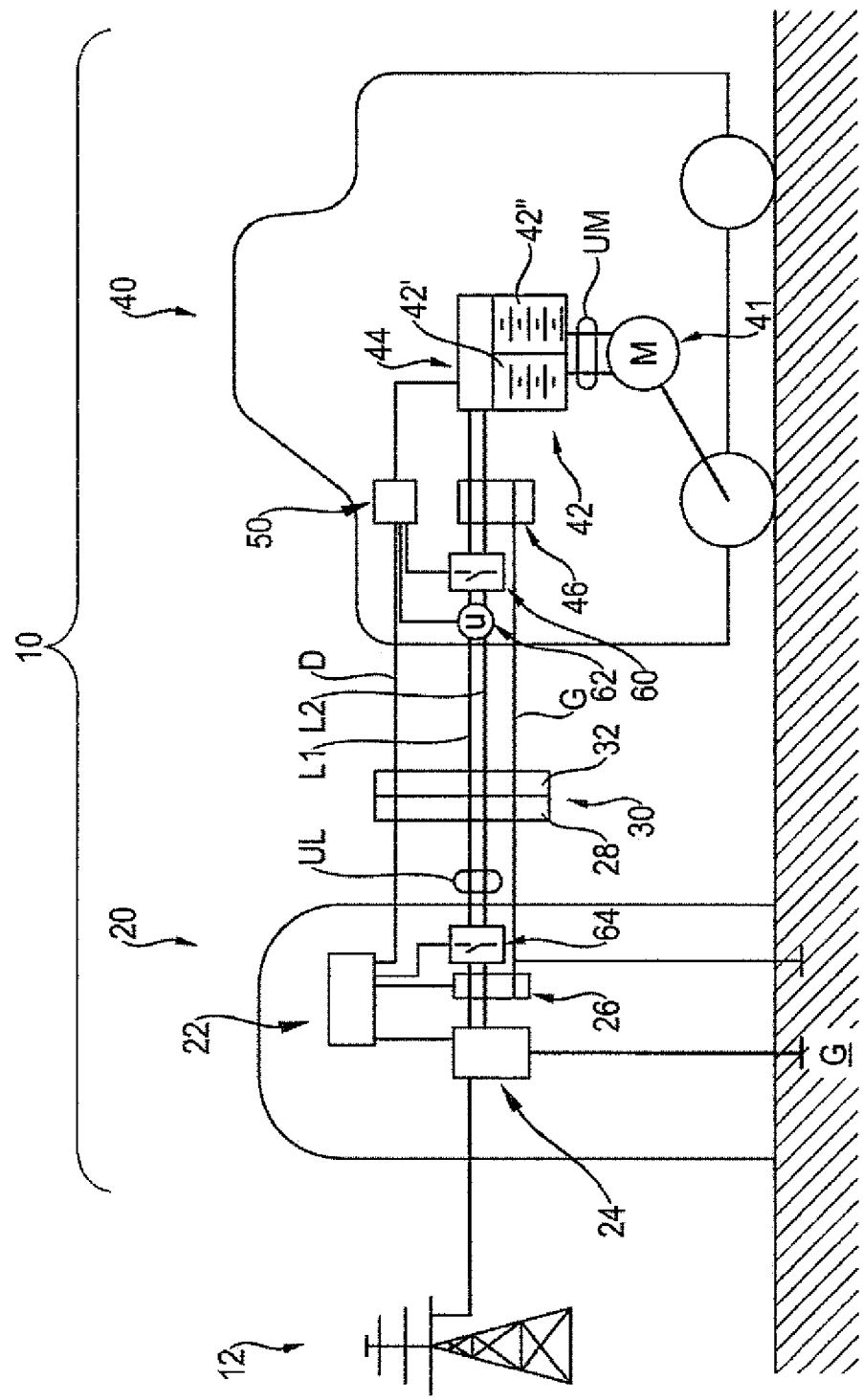

METHOD FOR CHARGING A TRACTION BATTERY OF A MOTOR VEHICLE

CROSS REFERENCE TO RELATED APPLICATION

This application claims priority under 35 USC 119 to German Patent Appl. No. 10 2020 120 383.7 filed on Aug. 3, 2020, the entire disclosure of which is incorporated herein by reference.

BACKGROUND

Field of the Invention

The invention relates to a method for charging a traction battery of a motor vehicle having an electric traction motor by way of a stationary charging column.

Related Art

The high-voltage traction batteries of motor vehicles driven supplementarily or exclusively by electric motor have different technical DC charging voltage levels of for example 400 V or 800 V depending on manufacturer and model. Vehicles that are designed to have a high drive power and the shortest possible charging time for charging the traction battery may have traction batteries with a technical charging voltage level with a high voltage value of for example 800 V.

In contrast, many high-voltage charging columns offer a lower voltage value of, for example nominally 400 V, as the maximum charging column voltage, including most charging columns in China. Communication protocols define the communication between the charging column charging controller and the vehicle charging controller. These protocols may prevent or complicate initiation of a charging process of a motor vehicle with a high technical traction battery charging voltage level of, for example 800 V, at a charging column with a lower maximum charging column voltage of for example 400 V.

After the electrical connection of the vehicle-side charging socket to the charging-column-side charging plug, the motor vehicle registers itself via its charging controller to the charging controller of the charging column with the nominal voltage value of the traction battery charging voltage level. In this example, a high voltage value of for example 800 V may exist. When the traction battery charging voltage level is above the nominal maximum charging column voltage of for example 400 V, the electrical insulation of the charging lines with respect to the ground potential is first tested by a charging column insulation tester when the vehicle-side protection relay is open, specifically at the lower of the two voltage values of the traction battery on the one hand and the maximum charging column voltage on the other. After the charging-column-side insulation test, the charging column charging controller ultimately rejects a charging process according to the existing communication protocols because the vehicle-side charging controller consistently requests a high charging voltage of for example 800 V. This occurs existing communication protocols because the existing vehicle charging controllers do not have any information about how high the maximum charging column voltage of the connected charging column is.

As a result, given accordingly restrictive communication protocols, the 800 V traction battery of the motor vehicle can be charged only at charging columns with a maximum charging column voltage with an equally high voltage value. This means that the network of charging columns for charging a traction battery with a high charging voltage level of for example 800 V may be very wide-meshed.

It is therefore the object of the invention to provide a method for charging a motor vehicle traction battery with a (higher) technical charging voltage level that also permits charging at its technically settable lower charging voltage at charging columns with a lower maximum charging column voltage.

SUMMARY

In the following text, the invention is described using the example of a motor vehicle with a technical charging voltage level of the traction battery of 800 V as high voltage value and a charging column with a maximum charging column voltage of either 400 V as low voltage value or 800 V. These voltage values are of course to be understood purely as examples. In any case, however, the traction battery is a so-called high-voltage traction battery with a technical charging voltage level of much more than 60 V. In the present case, the technical charging voltage level of the traction battery is always understood as a maximum nominal voltage value with which and at which the traction battery can be charged by a charging column to keep the charging time as short as possible. The technical charging voltage level can also be the voltage level with which the electric traction motor of the motor vehicle is fed by the traction battery during driving operation. In the present case, a charging column is to be understood not as a column in the spatial sense but is to be understood as a stationary charging terminal for charging the motor vehicle traction battery that forms the charging interface to the motor vehicle.

The charging column has a charging column charging controller for monitoring and controlling the charging process. To generate a high-voltage DC charging voltage, the charging column has a charging voltage converter that uses the supplied AC voltage of a supply network and generates the charging column voltage with which the traction battery of the motor vehicle is charged. Consideration is given first to only the configuration in which the charging voltage converter cannot provide the voltage value of the technical traction battery charging voltage level as maximum charging column voltage but instead a lower voltage value of, for example, 400 V DC.

The charging column has an insulation tester for testing the electrical insulation of the charging lines with respect to the electrical ground potential. Before initiating a charging process, the insulation tester of the charging column tests the electrical insulation or the electrical resistance of the two DC voltage charging lines through which the electrical charging energy flows from the charging column to the motor vehicle traction battery. The charging column also has a charging plug that can be connected mechanically and electrically to a corresponding charging plug of the vehicle for connecting the charging lines to one another electrically. In the present case, a charging plug is not intended to be understood as a specific shape but rather is to be understood as an arrangement that is designed to be able to be plugged mechanically and electrically together with another plug.

The motor vehicle has its own motor vehicle charging controller for monitoring and controlling the charging process. The motor vehicle has the electrical traction battery with a technical charging voltage level with a relatively high voltage value of, for example, 800 V. As a result, very rapid charging of the traction battery is possible at charging columns with a maximum charging column voltage with a voltage value of, for example, nominally 800 V. The traction motor can also effectively be supplied with electrical energy with the high voltage value of the technical charging voltage level. Heat losses can also be kept relatively low by way of a high technical charging voltage level of the motor vehicle traction battery.

The motor vehicle has a vehicle-side charging plug that can be connected to the corresponding charging column charging plug. In this case, two charging lines and a ground potential line are connected electrically to one another. Data also can be transmitted between the charging column charging control and the vehicle-side charging controller via wires or wirelessly.

The motor vehicle has a charging voltage adapter that can adapt a low charging column voltage of, for example, 400 V, to the technical traction battery charging voltage level of, for example, 800 V by what is known as stepping up. As an alternative, the traction battery can have two 400 V modules that can be connected electrically in parallel during charging when required, for example, by the charging voltage adapter, whereas the two 400 V modules are connected electrically in series during driving. In this way, the traction battery can selectively be charged with a charging column voltage of 400 V and also of 800 V. The charging voltage adapter is controlled by the vehicle charging controller.

The motor vehicle has a protection relay between the traction battery and the motor vehicle-side charging plug. The protection relay electrically isolates the charging lines from the traction battery as long as the actual charging process is not (yet) physically taking place and isolates the charging lines during the charging preparation. The protection relay is controlled by the charging controller of the motor vehicle. In the present case, a protection relay is to be understood as any technical embodiment of a contactor, not necessarily a technical relay.

The motor vehicle also has an electrical voltmeter associated with the charging lines of the motor vehicle between the protection relay and the charging plug. The voltmeter can always determine the voltage in the portion of the charging lines existing between the protection relay and the vehicle-side charging plug. The voltmeter measures the DC voltage between the two charging lines.

In accordance with the method of the invention, the following method steps are provided when the charging plugs are connected to one another:

First, the vehicle charging controller requests from the charging column charging controller a charging process or a charging process desire with the high desired charging voltage value of, for example, 800 V or notifies the charging column charging controller thereof. The first registration at a charging column thus always takes place with the high desired charging voltage value of, for example, 800 V, to ensure that the charging desire is recognized, accepted and ultimately executed by a charging column with a high maximum charging column voltage of, for example 800 V, as well as a charging desire with a desired charging voltage value of 800 V. In this case, the charging voltage adapter of the vehicle is possibly adapted or accordingly switched over to the high maximum charging column voltage of 800 V.

The power potential of a charging column with a high maximum charging column voltage can in this way be fully exhausted without problem.

According to the applicable communication protocols, a charging column with a low maximum charging column voltage of, for example, 400 V does not immediately reject a registered charging desire but provisionally accepts it for the maximum charging column voltage of 400 V. The motor vehicle protection relay is open in this phase, with the result that the traction battery is not connected electrically to the charging column by means of the charging lines.

Subsequently, the charging column charging controller uses the charging-column-side insulation tester to execute an insulation test at an insulation test voltage that corresponds to the requested charging voltage or to the maximum charging column voltage when the maximum charging column voltage is lower than the requested charging voltage. In the case considered presently, the lower voltage value that corresponds to the maximum charging column voltage is selected as insulation test voltage so that the insulation test voltage is approximately 400 V. For the insulation test, a charging-column-side protection relay, if present, also is closed so that the insulation test voltage is applied over the entire length of the charging lines between the vehicle-side protection relay and the charging voltage converter of the charging column. However, this is only necessary if the insulation tester is not arranged between the charging column protection relay and the charging plug. The applied insulation test voltage now is measured and transmitted to the vehicle-side charging controller by the vehicle-side voltmeter, which is arranged in the portion of the vehicle-side charging lines currently carrying voltage. Since the applied insulation test voltage corresponds to the maximum charging column voltage, the vehicle-side charging controller already has the voltage value of the maximum charging column voltage at this early time.

If the measured insulation test voltage is lower than the initially registered or requested desired charging voltage, the vehicle charging controller now registers the low measured voltage value from the insulation test or a correspondingly low suitable voltage value as a new requested charging voltage to the charging column charging controller and prompts the charging voltage adapter to be set to a voltage value corresponding to the low voltage value from the voltage measurement or to the suitable low voltage value in order to charge the traction battery.

Since the charging column charging controller receives a permissible and technically possible voltage value for the requested charging voltage even at this early time, the preparation process is not terminated at this point but is continued. In this way, thereby ensuring that the charging-column-side insulation test has been carried out at the voltage level at which the subsequent charging process takes place.

The method according to the invention achieves a situation in which a high-voltage traction battery with a nominally higher technical charging voltage level can be accepted and charged by a charging column with a lower maximum charging column voltage.

An embodiment of the invention is explained in more detail in the following text with reference to the drawing.

BRIEF DESCRIPTION OF THE DRAWING

The FIGURE schematically shows a motor vehicle charging arrangement having a motor vehicle having an electric traction battery, which is charged by a charging column.

DETAILED DESCRIPTION

The FIGURE shows a motor vehicle charging arrangement 10, which is formed substantially by a stationary charging column 20 and a motor vehicle 40, which has an electric traction motor 41 and an electric traction battery 42, which feeds electrical drive energy to the electric traction motor 41.

The traction battery 42 is a high-voltage traction battery with a technical charging voltage level UM of 800 V, and consists, for example, of a pair of two identical traction battery modules 42', 42" of 400 V each. The traction battery 42 has an associated charging voltage adapter 44, which steps up the charging voltage from, for example, 400 V to 800 V or which can electrically interconnect the traction battery modules 42', 42" in parallel or in series so that the traction battery 42 can be charged alternatively both with a charging voltage of 400 V when the voltage adapter 44 electrically connects the two modules 42', 42" in parallel or can be charged with 800 V charging voltage when the charging voltage adapter 44 electrically connects the two traction battery modules 42', 42" in series.

The motor vehicle 40 has a vehicle charging controller 50, which controls the entire charging process on the vehicle side and for this purpose communicates with a corresponding charging-column-side charging controller 22. The motor vehicle 40 has an insulation tester 46, which can test the two charging lines L1, L2, which run from a vehicle-side charging plug 32 to the charging voltage adapter 44, in each case for sufficient electrical insulation with respect to the electrical ground potential G at a test voltage.

The motor vehicle 40 has a protection relay 60, electrically associated with the two charging lines L1, L2, between the traction battery 42 or the charging voltage adapter 44 on the one hand and the vehicle-side charging plug 32 on the other. By way of the protection relay 60, the two charging lines L1, L2 between the charging column 20 and the traction battery 42 can be electrically interrupted at this point when needed. The protection relay 60 is controlled by the vehicle-side charging controller 50.

The motor vehicle 40 also has an electrical voltmeter 62, associated with the charging lines L1, L2, between the protection relay 60 and the charging plug 32. The voltage between the two charging lines L1, L2 can be measured by the voltmeter 62, for example during an insulation test on the charging column side.

The charging column 22 is supplied with electrical energy by a high-voltage supply network 12, said electrical energy being fed in in the form of a high-voltage AC voltage in a charging voltage converter 24 of the charging column 20. The charging voltage converter 24 is electrically connected to the ground potential by means of a corresponding grounding line and in the present case converts the AC voltage fed in to a maximum charging column voltage ULMAX with a low voltage value U1 of nominally 400 V DC. However, there are also charging columns that provide a maximum charging column voltage with a high voltage value U2 of for example nominally 800 V. Stored in the vehicle charging controller 50 is a charging controller program, which permits charging of the traction battery 42 both by way of a charging column with a maximum charging column voltage with a high voltage value U2 of 800 V and with a low voltage value U1 of 400 V. Since the communication and the charging process with a charging column with a high maximum charging column voltage U2 equal to 800 V is unproblematic, this exemplary embodiment considers only the case in which the maximum charging column voltage ULMAX corresponds to a lower voltage value U1 of for example 400 V than the higher voltage value U2 equal to 800 V of the technical charging voltage level of the traction battery 44.

The charging column 20 has its own separate insulation tester 26, which tests the electrical insulation or the electrical resistance of the two charging lines L1, L2 in each case with respect to the ground potential G as soon as this is initiated by the charging column charging controller 22. The charging column 20 has its own protection relay 64 associated with the internal charging lines L1, L2 and controlled by the charging column charging controller 22.

The charging column 20 has an electrically associated charging column charging plug 28, which can be electrically connected to the vehicle charging plug 32 to form a charging plug arrangement 30. As a result, each of the two charging lines L1, L2 electrically connects at least one data line D and a separate grounding line.

In the present case, the method according to the invention is initially described using the example of a charging column with a maximum charging column voltage ULMAX with a low voltage value U1 of 400 V, since the special feature of the method according to the invention becomes effective in this configuration.

After the two charging plugs 28, 32 have been plugged together, the vehicle charging controller 50 registers to the charging column charging controller 22 a charging process with the high maximum voltage value U2 of 800 V as requested charging voltage UR that corresponds to the maximum technical charging voltage level of the traction battery 42. This registration is provisionally accepted by the charging column charging controller 22, whereupon said controller prompts the charging column insulation tester 26 to carry out an insulation test for the maximum charging column voltage ULMAX of U1 equal to 400 V because an insulation test with the high voltage value U2 of 800 V is neither possible nor technically useful. During the insulation test, if the insulation tester on the charging column side is installed upstream of the protection relay, the two charging lines L1, L2 coming from the charging voltage converter 24 when the protection relay 64 is closed are each tested for their insulation resistance with respect to the ground potential G at an insulation test voltage UI with a voltage value of U1 equal to 400 V. During the insulation test, the maximum charging column voltage ULMAX amounting to approximately 400 V is thus applied to the charging lines L1, L2 between the vehicle-side protection relay 60 and the charging voltage converter 24.

Since the voltmeter 62 is arranged in the voltage-carrying portion of the charging lines L1, L2, it can determine the maximum charging column voltage ULMAX under certain circumstances. The vehicle-side charging controller 50 thus discovers at a relatively early time that the maximum charging column voltage ULMAX is below the technical charging voltage level of the traction battery.

In this case, the vehicle charging controller 50 (again) registers to the charging column charging controller 22 a charging process or a charging voltage with the voltage value of the insulation test voltage UI determined by the voltmeter 62 or the identical maximum charging column voltage ULMAX in the present case in the amount of U1 equal to 400 V or a suitable voltage value that is technically useful and lower than ULMAX. This prevents the charging column charging controller 22 from terminating the charging process due to an insufficient maximum charging column voltage in a later phase of the charging preparation.

The entire charging preparation is thus continued based on the new requested charging voltage UR of for example 400 V, which is now no longer above the maximum charging column voltage ULMAX of 400 V. When the charging column charging controller 22 finally accepts the now requested charging voltage UR of the low voltage value U1 of 400 V, the vehicle charging controller 50 instructs the voltage adapter 44 to be set to a charging voltage UL corresponding to the low voltage value U1 of 400 V or to switch over thereto. The voltage adapter 44 for this purpose electrically connects for example the two traction battery cells 42', 42" in parallel or steps up the voltage. At the same time, the vehicle charging controller 50 prompts the vehicle-side insulation tester 46 to carry out an insulation test with the low voltage value U1 of 400 V and to continuously repeat this throughout the entire subsequent charging process.

When the vehicle charging controller 50 registers to a charging column 20 with a maximum charging voltage ULMAX with a high voltage value U2 of 800 V, the charging voltage adapter 44 is set to a charging voltage UL corresponding to the high voltage value U2 at the latest shortly before the start of the actual charging operation, for example by virtue of the two traction battery modules 42', 42" being electrically connected in series or it being disconnected entirely.

What is claimed is:

1. A method for charging a traction battery of a motor vehicle having an electric traction motor by way of a stationary charging column,
    wherein the charging column has:
    a charging column charging controller for monitoring and controlling the charging process,
    a charging voltage converter for providing a DC charging column voltage fed in in charging lines,
    an insulation tester for testing the electrical insulation of the charging lines with respect to the ground potential, and
    a charging-column-side charging plug,
    wherein the charging voltage converter provides a fixed maximum charging column voltage for charging the traction battery that may be a low voltage value or a high voltage value,
    wherein the motor vehicle has:
    a charging controller for monitoring and controlling the charging process,
    a vehicle-side charging plug,
    the motor vehicle traction battery, which has a technical charging voltage level with the high voltage value,
    a charging voltage adapter, by way of which the charging column voltage is adapted to the technical charging voltage level of the traction battery where needed,
    a protection relay, associated with the charging lines, between the traction battery and the charging plug, and
    an electrical voltmeter, associated with the charging lines, between the protection relay and the charging plug,
    the method comprising the following steps when the charging plugs are connected:
    registering a charging process by way of the vehicle charging controller to the charging column charging controller with the high voltage value as requested maximum charging voltage,
    when the motor vehicle protection relay is open: controlling an insulation test, carried out by the charging-column-side insulation tester, by way of the charging column charging controller for an insulation test voltage, which corresponds to the requested maximum charging voltage or to the maximum charging column voltage when the latter is lower than the requested maximum charging voltage,
    measuring the insulation test voltage by way of the voltmeter,
    if the measured insulation test voltage corresponds to a lower voltage value than that of the technical charging voltage level: registering a charging process by way of the vehicle charging controller to the charging column charging controller with the low voltage value as new requested charging voltage and setting the charging voltage adapter to a charging column voltage corresponding to the low voltage value.

2. The method for charging a traction battery of a motor vehicle of claim 1, having the following method step after the measurement of the insulation test voltage:
    if the measured insulation test voltage corresponds to the high voltage value:
    setting the charging voltage adapter to a charging column voltage corresponding to the high voltage value.

* * * * *